June 10, 1924.

J. T. HOHBERGER

CANDY MAKING MACHINE

Filed Oct. 26, 1921

Inventor.
John T. Hohberger.
Jabel + Mueller
Attys.

June 10, 1924.

J. T. HOHBERGER

CANDY MAKING MACHINE

Filed Oct. 26, 1921   4 Sheets-Sheet 3

1,496,880

Inventor.
John T. Hohberger.
By Gabel & Mueller
Attys.

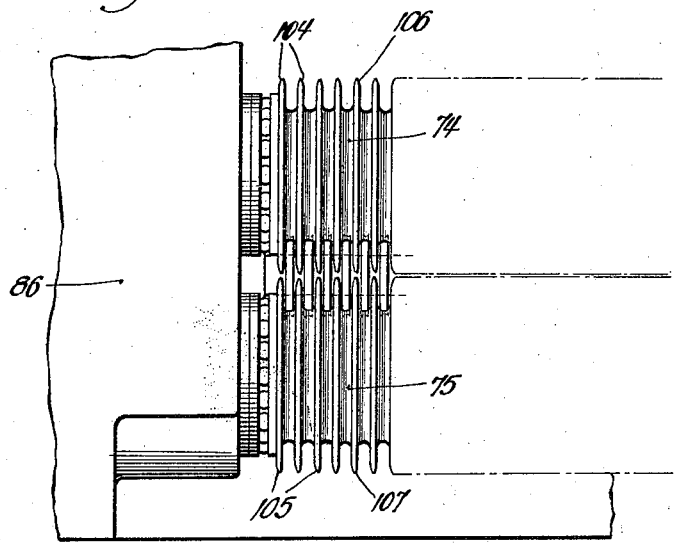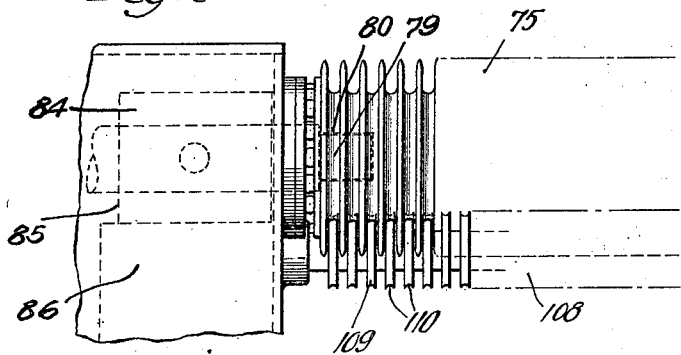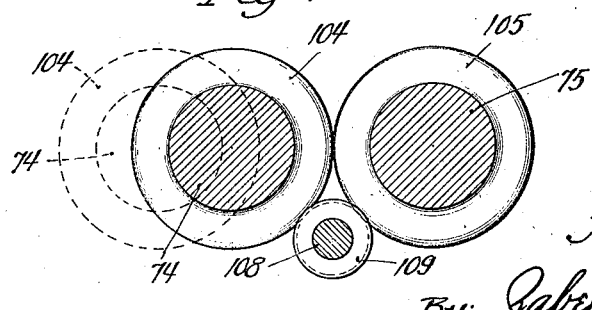

Patented June 10, 1924.

1,496,880

UNITED STATES PATENT OFFICE.

JOHN T. HOHBERGER, OF CHICAGO, ILLINOIS.

CANDY-MAKING MACHINE.

Application filed October 26, 1921. Serial No. 510,539.

*To all whom it may concern:*

Be it known that I, JOHN T. HOHBERGER, a citizen of the United States, residing at Chicago, in the county of Cook and State of Illinois, have invented a certain new and useful Improvement in Candy-Making Machines, of which the following is a full, clear, concise, and exact description, reference being had to the accompanying drawings, forming a part of this specification.

My invention relates to candy making machines and more particularly to a rolling machine whereby candy is automatically formed into a suitable ball formation preferably with somewhat flattened end portions.

It is a purpose of the invention to provide a machine for simultaneously forming a large number of pieces of candy which are of any desired formation, approximating that of a ball or a ball with flattened portions, such as candy goose berries, or what are known as sun beam kisses.

It is a further purpose of the invention to provide a new and improved method of making candy of this nature which comprises sizing the candy or forming the same into an elongated strip of substantially uniform diameter, cutting said strip into predetermined lengths, and then cutting the same off and forming the same between rolls provided with spaced cutting and forming flanges by gradually increasing the pressure on the length previously cut from the strip so as to roll the end portions of the individual pieces as they are cut apart and finally releasing the pieces from the cutting rolls by a sudden separating movement of the rolls.

It is still a further purpose of the invention to provide a machine for carrying out this method which is used in conjunction with a sizing machine comprising a pair of drums or rollers having grooves therein arranged opposite each other for forming candy into a strip of substantially uniform diameter throughout, which machine comprises a belt conveyor member on which the strip is received, a cutting shears operated in synchronism with the movement of said belt so as to cut off predetermined lengths, means for moving a length of said candy laterally off said belt, and guiding the same between rolls provided with spaced cutting and forming flanges, one of which rolls is adapted to move toward the others gradually and away therefrom substantially instantaneously, and means for guiding the separated and properly shaped pieces of candy into a suitable receptacle.

It is a further object of the invention to provide cutting rolls having cutting flanges or edges which are provided with beveled or tapered edge portions and which gradually widen to a substantial thickness to distinguish from cutting rolls that have thin flanges with sharpened edge portions and to provide rolls of this character which may be removed from the machine so that a roll with cutting and shaping flanges of any other size or shape or any other spacing can be used to form candies of any other desired shape or size.

It is another object of the invention to provide suitable guide means for the belt at the cutting shears so as to guide the strip of candy into such position as to be readily cut by the shears.

It is also an object of the invention to provide suitable means for gradually moving the movable roll into engaging position, said means comprising a cam member having a cam face gradually increasing in height, said cam face being provided with an abrupt shoulder extending from the highest point of the cam to the lowest point thereof to suddenly separate the engaging edge of the movable roll from the other rolls, spring means being provided for holding a roller cooperating with said cam in engagement therewith. Preferably one of the cutting rolls turns on a fixed axis and the other cutting roll is movable toward and away from said roll turning on a fixed axis. A pair of cams for moving said movable roll is preferably provided, one cam at each end of the roll. As the rolls for forming and cutting the candies are revolving all the time, it is necessary to provide suitable means for driving the movable roll for all positions thereof, said means comprising a spiral toothed gear on the end of the movable roll meshing with a spiral toothed gear on the drive shaft that is of such width that the teeth thereof will be in engagement with the teeth of the gear on the end of the movable roll for all positions thereof. In addition to the two cutting rolls a forming roll is provided which turns about a fixed axis and which with the oppositely arranged cutting rolls forms and cuts off the candy as the movable roll gradually approaches the rolls rotating on the fixed axes.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art, and as would fall within the scope of the claims.

In the drawings:

Fig. 5 is an enlarged fragmentary plan view of the rolls and adjacent parts showing the cutting rolls;

Fig. 6 is a similar view of one of the cutting rolls and forming roll cooperating therewith;

Fig. 7 is a view taken on the line 7—7 of Fig. 5; and

Figure 1:
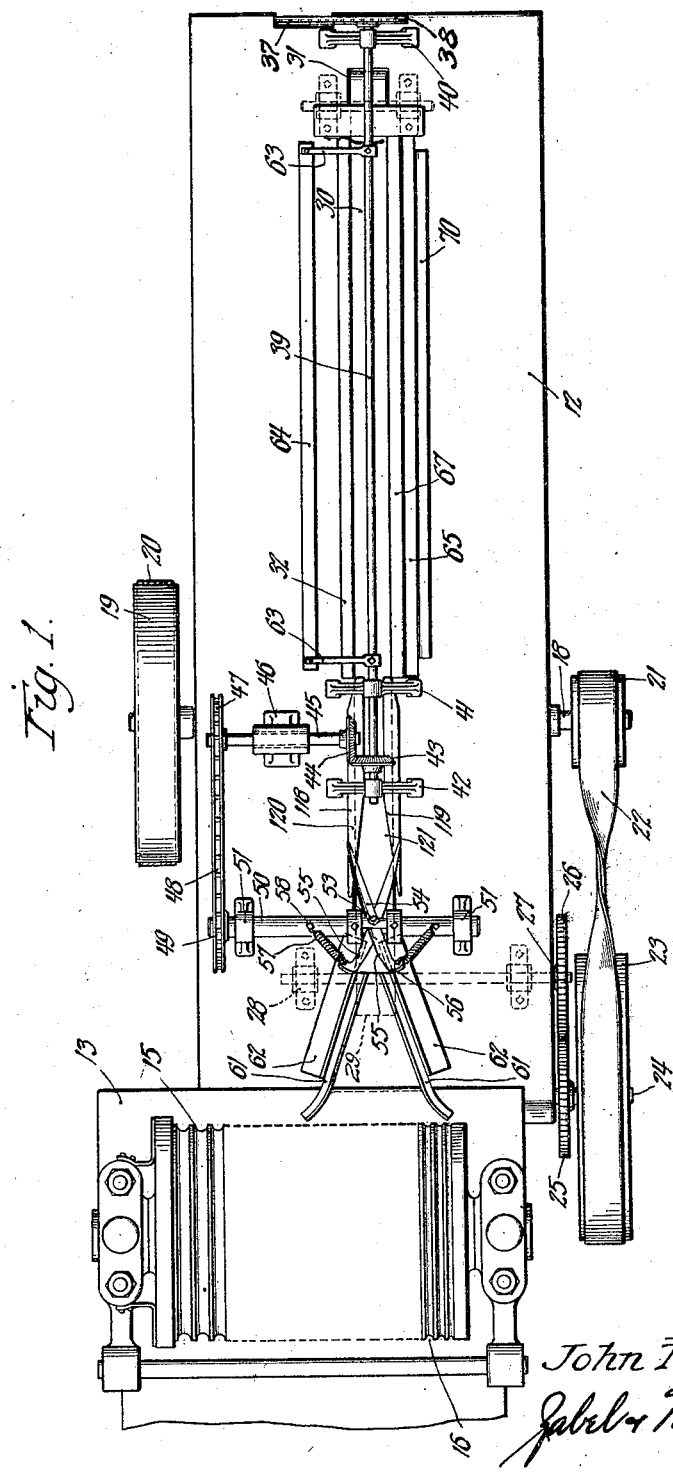
Fig. 1 is a plan view partly broken away of my improved machine.

Referring in detail to the drawings, the machine comprises a framework 10 having the legs 11 upon which the framework is mounted and a table 12 which extends from the sizing machine 13 having the base portion 14 and provided with the sizing rolls or drums 15. The sizing machine is not a part of this invention except in connection with the process of making the candy set forth herein, the sizing machine itself being well known in the art. The drums or rolls 15 as is well known are provided with grooves or depressions 16 arranged opposite each other of various sizes for making elongated pieces or strips of candy of substantially uniform diameter. Journaled in the framework 10 in the upstanding portion 17 thereof is the main drive shaft 18 of the machine which is provided with a suitable driving pulley 19 driven from any desired source of power by means of the belt. The opposite end of the shaft 18 is provided with a pulley 21 over which extends the belt 22 which also extends over the pulley 23 mounted on the shaft 24, said shaft 24 having keyed thereto the gear 25 which meshes with the gear 26 on the shaft 27 which is supported by means of suitable hangers 28 from the table 12. The shaft 27 carries a pulley 29 over which the conveyor belt 30 extends, said conveyor belt passing over said pulley 29 at one end of the machine and over the pulley 31 at the other end of the machine. The conveyor belt 30 travels in a recess 32 in the table 12 as will be clear from Fig. 4. The main drive shaft 18 is provided with a worm 33 which meshes with the worm wheel 34 on the shaft 35 to rotate said shaft in the direction of the arrow in Fig. 4. The end of the shaft 35 opposite that carrying the worm wheel 34 is provided with a sprocket wheel 36 over which the chain 37 operates, said chain 37 passing over the sprocket wheel 38 on the shaft 39. The shaft 39 is journaled in the standards 40, 41, and 42 mounted on the table 12. It is provided on the opposite end thereof to the sprocket 38 with a beveled gear 43 meshing with the beveled gear 44 keyed on the shaft 45, which shaft is journaled in bearings in suitable standards 46 and which carries the sprocket 47 over which the chain 48 travels, said chain also passing over the sprocket 49 on the shaft 50 journaled in the standards 51. The shaft 50 is provided with a slot 52 intermediate the ends thereof and with a pivot member 53 extending at right angles to said slot upon which are supported the blades 54 of a shears, which blades extend through the slot 52. The blades 54 are provided with extensions 55 which project rearwardly from the pivot point 53 and which terminate in perforated ears 56 and have secured thereto the spiral springs 57 which are secured to suitable pins 58 on the shaft 50.

It will thus be seen that the shears having the blades 54 will rotate about the shaft 50 as an axis at a speed proportioned to the speed at which the conveyor belt travels depending upon the ratio of the gear and the size of the sprocket used in the driving mechanism. The table 12 is provided with a lip portion 59 which rests on a projecting shelf 60 on the sizing machine 13, and it will be seen that as the strip of candy leaves the sizing machine the same will be guided toward the belt 30 by the guide members 61 which project onto the discharge end of the sizing machine from the table 12. The guides 61 converge as will be clear toward the end thereof adjacent the belt 30, and as the shears will rotate at a speed in proportion to the speed of travel of the belt 30, the blades of the shears will come into cooperating relation with the belt every time a certain definite length of the belt has passed below the shaft 50. As the strip of candy is traveling at substantially the same rate of speed as the belt 30 a predetermined length of the candy will pass below the shears with every revolution of the shaft 50 and every rotation of said shears.

Figure 2:
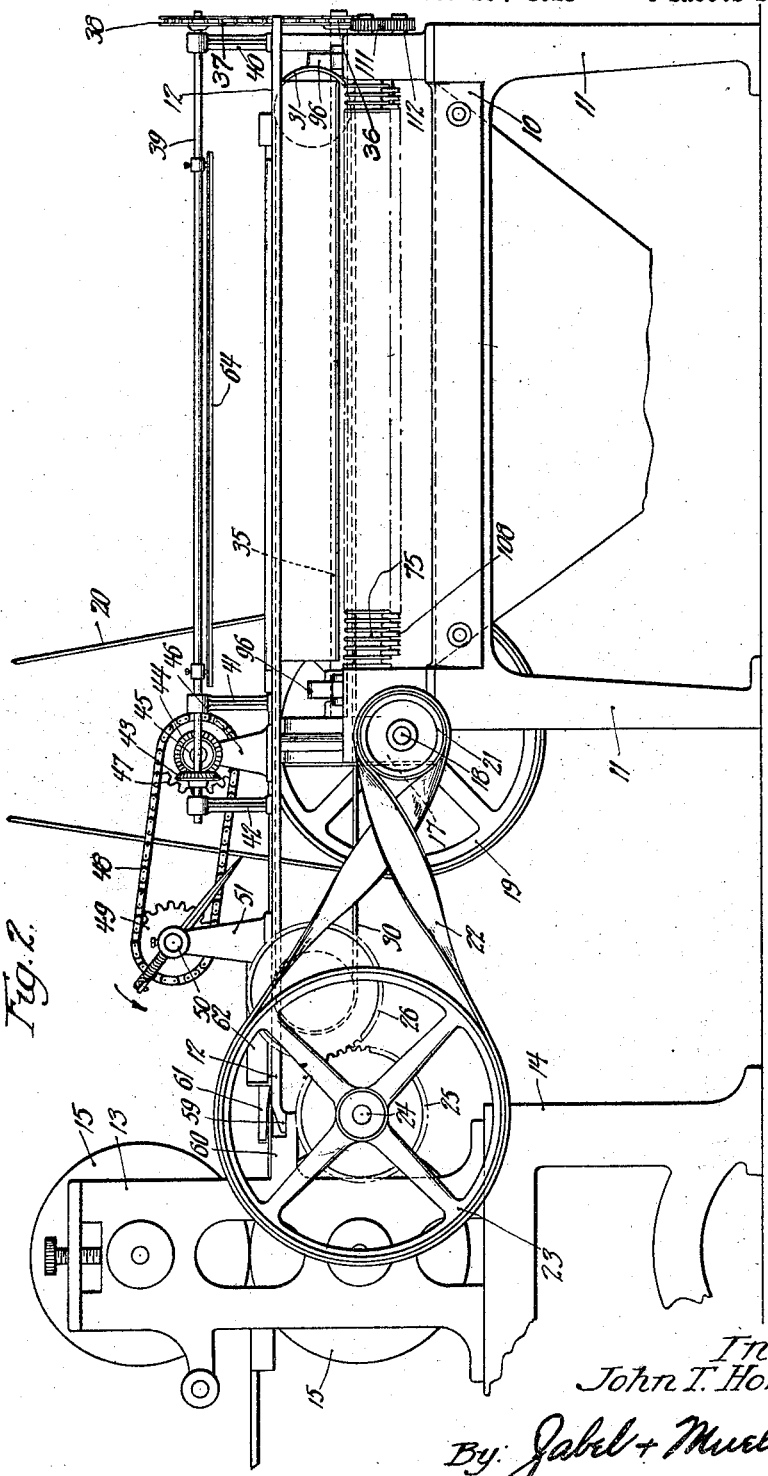
Fig. 2 is a side elevation partly broken away thereof.

It will be seen that the blades 54 are held open by means of the springs 57, said springs being tension springs, and that the shears in order to cut the candy into proper lengths must be moving in opposition to the springs 57 so as to bring the blades 54 into cutting position. This is accomplished by means of the guide members 62 which are shown as being made of angle iron and which converge toward the shaft 50. The shears rotate in the direction indicated by the arrow in Fig. 2 and thus the blades will approach each other as the shears approaches the lowermost position of its movement in its rotation with the shaft 50. Thus the blades will come together as the same are substantially in a vertical position and will cut off a predetermined length of the candy coming from the sizing machine. Thus predetermined lengths of candy are carried along the belt 30 toward the pulley 31.

It will be noted that the sprockets 47 and 49 are of the same size and that the beveled gears 43 and 44 are of the same size and that accordingly the shaft 39 rotates in synchronism with the shaft 50. The shaft 39 has pinned thereto the arms 63 between which arms extends the bar 64. The arms 63 and the bar 64 turn with the shaft 39 in the direction of the arrow in Fig. 4, the bar 64 thus making one revolution with the shaft with each revolution of the shears with the shaft 50. The table 12 is provided with a slot 65 therein to one side of the belt 30, as will be clear from Figs. 1 and 4. The table is also provided with a pair of ribs 66 and 67 at each side of the recess 32, said ribs having beveled faces 68 and 69 respectively. Between the ribs 66 and 67 and the cutting mechanism are the guides 118 and 119 having the converging faces 120 and 121. The rib 67 is located between the belt 30 and the slot 65 and the rib or lip 70 is provided on the opposite side of the slot 65 from the rib 67.

Figure 4:
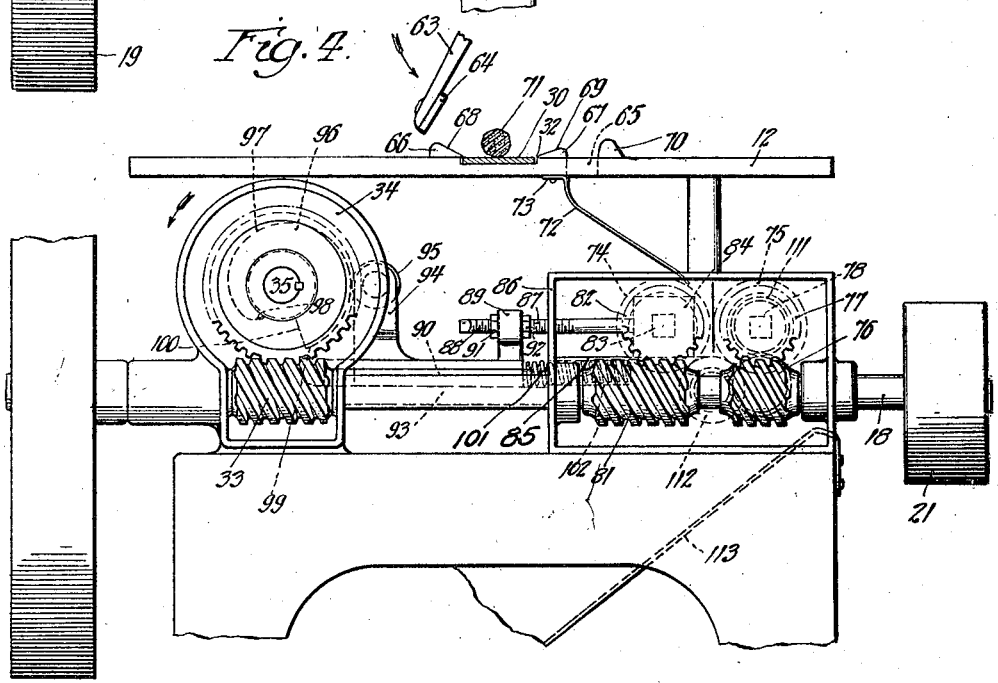
Fig. 4 is a broken end elevation of the end of the machine shown in Fig. 3.
Figure 8:
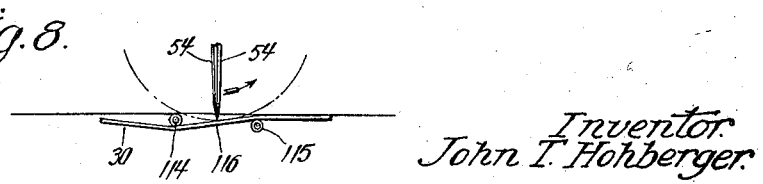
Fig. 8 is a fragmentary detail view showing guide rollers for the conveyor belt to provide an offset portion therein for receiving the cutting shears as the same rotates.

It will be seen that as the arms 63 move in the direction of the arrow in Fig. 4, the bar 64 will engage with the strip of candy shown at 71, and it will move the same up the beveled surface 69 and sweep the same off of the rib 67 into the opening 65 from which the candy will drop onto the guideway 72 which is secured to the bottom side of the table 12 at 73. The guide 72 extends from the slot 65 to a position above the rolls 74 and 75, thus the length of candy that has been cut off by the shears will be moved laterally into position on the rolls 75.

The shaft 18 is provided with a spiral gear 76 which meshes with a gear 77 on the shaft 78. The shaft 78 is provided with a squared end portion 79 projecting into the squared opening 80 in the end of the roll 75. The shaft 18 is also provided with the spiral gear 81 which meshes with a spiral gear 82 which is carried by the shaft 83 which is also provided with a squared end portion, as will be clear from Fig. 4, entering and opening in the roll 74 in a similar manner to the squared end portion of the shaft 78. The end of the shaft 83 is carried by a block 84 slidable in the guideway 85 in the gear box 86. Extending laterally from the block 84 and through the casing 86 toward the shaft 35 is a rod 87 which is screw threaded as at 88, and which has mounted thereon the perforated arm 89 of the member 90, said arm being adjustable on the rod 87 by means of the nuts 91 and 92. The member 90 is slidably mounted on the guide 93 between the guide members 93′ and is provided with an upstanding member 94 having ears 94′ between which is mounted the roller 95 which cooperates with the cam 96 provided on the shaft 35. The cam 96 is provided with a face 97 cooperating with the roller 95 which gradually increases in height from the point 98 to the point 99, and which is provided with an abrupt shoulder 100 at the point 99. Bearing against the member 90, and extending into the casing 86 is a coil spring 101, said spring being seated in the recess 102 in said casing.

Figure 3:
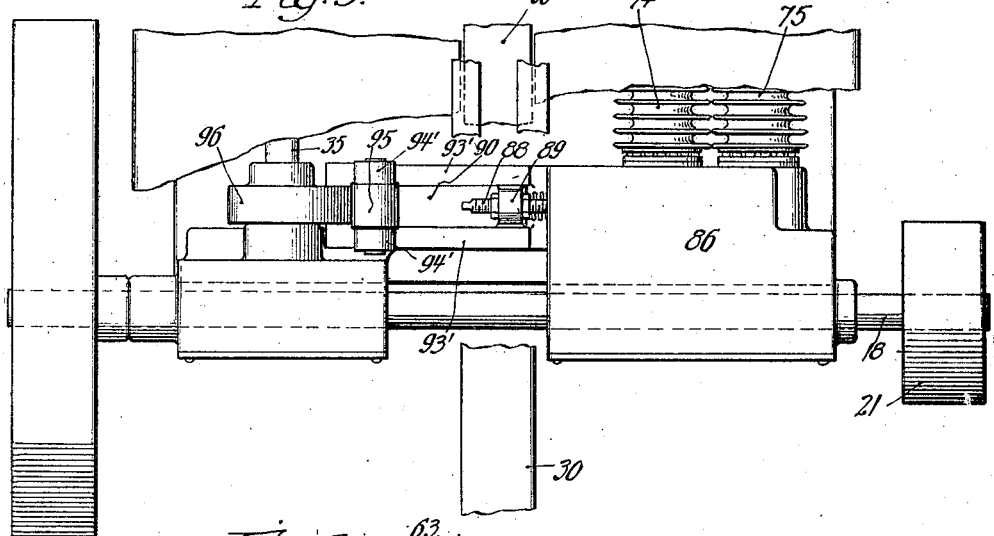
Fig. 3 is a fragmentary plan view of one end of the machine.

It will be seen that as the cam rotates in the direction of the arrow in Fig. 4, the roller 95 and the member 90 carrying the rod 87 and the block 84 will be moved to the right in Fig. 3 due to the engagement of the roller with the cam face which gradually increases in height, and that when this movement occurs the spring 101 will be compressed so that when the roller 95 reaches the shoulder 100 it will drop suddenly down to the lowermost position of the cam 103 due to the action of the spring 101. It will thus be seen that the roll 74 carried by the shaft 83 will be moved toward the roll 75 gradually and will be suddenly moved away therefrom when the roller moves down the shoulder 100 on the cam.

It will be seen from Fig. 5 that the roll 74 is provided with a plurality of equi-distantly spaced flanges 104 and that the roll 75 is formed with similarly spaced flanges 105. The flanges 104 gradually taper as shown at 106 to substantially a thin edge, although said edges are slightly rounded off at their ends so as to not form a knife edge, although the edges are sharp enough to cut the candy. The members 105 are similarly tapered at 107. When the roller reaches the highest point of the cam the flanges 104 and 105 contact and thus cut off the candy into pieces of uniform size and shape. The roll 74 approaches the roll 75 gradually so as to provide for a gradually increased pressure on the candy which has traveled down the guide way 72 onto the rolls. When the candy drops from the guideway 72 the roll 74 is removed from the roll 75 so that said rolls are spaced from each other with the roll 74 substantially in the dotted line position shown in Fig. 7. There is then sufficient space for the candy to fall between the rolls 74 and 75 and onto the forming roll 108 which is positioned below the rolls 74 and 75 and which is provided with flanges 109 which are of such a width as to pass between the flanges 104 and the flanges 105 and which are provided with outer peripheral faces shaped so as to form the candy into the desired contour, the flanges in the present instance being shown as being provided with substantially arcuate grooves 110 to form ball-like pieces of candy. The members 74 and 75 and the member 108 revolve constantly. The member 74 will revolve no matter what position the same is in due to the construction of the spiral gear 81, which is of such a length that the gear 82 may travel back and forth over the same as the roll 74 is moved back and forth due to the action of the cam 96. The lower roll 108 is driven by the gear 111 which is mounted on the end of the shaft for the roll 75 opposite that at which the spiral gear 76 is located, said gear 111 meshing with the gear 112 provided on the end of the roll 108. When the candy has dropped between the rolls 74 and 75 and onto the roll 108, the roll 74 approaches the roll 75, the candy will then be compressed with a gradually increasing pressure between the rolls 74 and 75 and 108, thus the candy is gradually formed due to the shape of the peripheral faces on the roll 108 and due to the shape of the cutting flanges 104 and 105 and is gradually cut through until the flanges 104 and 105 meet at which time the candy is severed or substantially severed into individual pieces of the desired shape. At this time the roller cooperating with the cam drops down along the shoulder 100 and the spring 85 suddenly separates the roll 74 from the rolls 75 and 108 and the candy drops onto the guideway 113 from which it rolls into a receptacle for the same.

It is, of course, understood that throughout the operations of the machine as described above which are very rapid, the candy is quite warm and in a plastic condition, thus enabling the same to be readily molded by the rolls and cut by the cutting flanges. In order that the shears having the blades 54 will properly cut the lengths of the candy, the belt 30 may be provided with rollers 114 on the upper side thereof and 115 on the lower side thereof to provide a bend as 116 in the conveyor belt 30 so as to accommodate the blades 54 of the shears and enable the same to engage with the candy without interference therewith on the part of the belt.

It will thus be seen that the machine is entirely automatic and does not require the attention of an operator to cut off and form the pieces of candy from said strip, and that the same operates continuously and efficiently to produce pieces of candy of the desired contour.

Having thus described my invention, what I desire to claim and secure by U. S. Letters Patent is:

1. A machine of the character described comprising a plurality of cutting and forming rolls, one of said cutting rolls being movable toward and away from said other rolls, and means for rotating said rolls comprising a drive shaft, spiral gearing between said rolls and said shaft, said gearing comprising a spiral gear on one end of said movable roll and a wide faced spiral gear on said drive shaft meshing therewith.

2. A machine of the character described comprising a table, candy cutting means mounted above said table, said means comprising a shaft, shears mounted to rotate with said shaft in synchronism with the movement of said belt, a conveyor belt mounted to move along the upper surface of said table, means for forming and cutting said candy into pieces comprising a plurality of flanged rolls and means for moving said candy off said belt to feed the same to said rolls.

3. A machine of the character described comprising a table, candy cutting means mounted above said table, said means comprising a shaft, shears mounted to rotate with said shaft in synchronism with the movement of said belt, means for normally holding the blades of said shears separated, and means for moving said blades into cutting relation when the same are substantially in engagement with said belt.

4. A machine of the character described comprising a table, candy cutting means mounted above said table, a conveyor belt mounted to move along the upper surface of said table, means for forming and cutting said candy into pieces comprising a plurality of flanged rolls and means for moving said candy off said belt to feed the same to said rolls, said means comprising a pair of arms rotating above said belt and transversely thereof, and a wiper bar connecting said arms.

5. A machine of the character described comprising a table, candy cutting means mounted above said table, a conveyor belt mounted to move along the upper surface of said table, means for forming and cutting said candy into pieces comprising a plurality of flanged rolls, said table being provided with a slot extending parallel to said belt, a guide extending from said slot to said rolls, and means for moving said candy laterally off said belt and into said slot, whereupon said candy moves by gravity to said rolls.

6. A machine of the character described comprising a table, candy cutting means mounted above said table, said means comprising a pair of shears rotating about an axis transverse to said belt, and means for providing a bend in said belt to accommodate said shears as it moves into cutting position adjacent said belt.

7. A machine of the character described comprising a table, candy cutting means mounted above said table, said means comprising a pair of shears rotating about an axis transverse to said belt, and means for providing a bend in said belt to accommodate said shears as it moves into cutting position adjacent said belt, said means comprising rollers above and below said belt to deflect the same from its normal path of movement.

In witness whereof, I hereunto subscribe my name this 19th day of October, A. D. 1921.

J. T. HOHBERGER.